(12) United States Patent
Chiappa et al.

(10) Patent No.: US 7,188,673 B2
(45) Date of Patent: Mar. 13, 2007

(54) PROCESS FOR REDUCING THE PRODUCTION OF WATER IN OIL WELLS

(75) Inventors: Luisa Chiappa, Nerviano Milan (IT); Maria Andrei, Mediglia Milan (IT); Thomas Paul Lockhart, Lodi (IT); Giovanni Burrafato, Tavazzano Lodi (IT); Giuseppe Maddinelli, Milan (IT)

(73) Assignees: Eni S.p.A., Rome (IT); Enitechnologie S.p.A., San Donato Milanese (IT)

( * ) Notice: Subject to any disclaimer, the term of this patent is extended or adjusted under 35 U.S.C. 154(b) by 0 days.

(21) Appl. No.: 11/374,044

(22) Filed: Mar. 14, 2006

(65) Prior Publication Data

US 2006/0157245 A1    Jul. 20, 2006

Related U.S. Application Data

(63) Continuation of application No. 10/478,321, filed as application No. PCT/EP02/05325 on May 10, 2002, now abandoned.

(30) Foreign Application Priority Data

May 25, 2001   (IT) .......................... MI2001A1112

(51) Int. Cl.
*E21B 33/138* (2006.01)
*E21B 43/22* (2006.01)

(52) U.S. Cl. .................. 166/263; 166/294; 166/295; 166/305.1; 507/222; 507/225; 523/130

(58) Field of Classification Search ............... 166/263, 166/294, 295, 305.1; 507/222, 225, 244; 523/130, 131, 132
See application file for complete search history.

(56) References Cited

U.S. PATENT DOCUMENTS

| | | | | | |
|---|---|---|---|---|---|
| 3,779,316 | A | * | 12/1973 | Bott .......................... | 166/276 |
| 4,484,631 | A | * | 11/1984 | Sherwood et al. .......... | 166/400 |
| 4,532,052 | A | * | 7/1985 | Weaver et al. .............. | 507/222 |
| 4,617,132 | A | * | 10/1986 | Dalrymple et al. ......... | 523/130 |
| 5,529,124 | A | * | 6/1996 | Hwan ......................... | 166/294 |
| 5,944,106 | A | * | 8/1999 | Dalrymple et al. ......... | 166/281 |
| 6,364,016 | B1 | * | 4/2002 | Dalrymple et al. ......... | 166/270 |
| 6,465,397 | B1 | * | 10/2002 | Patterson .................... | 507/222 |
| 6,474,413 | B1 | * | 11/2002 | Barbosa et al. ............. | 166/270 |
| 6,516,885 | B1 | * | 2/2003 | Munday ..................... | 166/295 |
| 6,803,348 | B2 | * | 10/2004 | Jones et al. ................. | 507/221 |
| 2004/0144542 | A1 | * | 7/2004 | Chiappa et al. ........... | 166/305.1 |

* cited by examiner

*Primary Examiner*—George Suchfield
(74) *Attorney, Agent, or Firm*—Oblon, Spivak, McClelland, Maier & Neustadt, P.C.

(57) ABSTRACT

A process is described for reducing the production of water in oil wells which comprises the injection into the formation around the well of an aqueous solution of one or more polymers selected from those having general formula (I), wherein: n ranges from 0.70 to 0.98; m ranges from 0.30 to 0.02; n+m=1; $X_1$ and $X_2$, the same or different, are selected from H and $CH_3$; $R_1$, $R_2$, $R_3$, the same or different, are selected from $C_1$–$C_{10}$ monofunctional hydrocarbyl groups; and x ranges from 2 to 5.

13 Claims, No Drawings

PROCESS FOR REDUCING THE PRODUCTION OF WATER IN OIL WELLS

The application is a continuation of application Ser. No. 10/478,321, filed on Nov. 20, 2003, now abandoned, which is a 371 of application PCT/EP02/05325, filed on May 10, 2002.

The present invention relates to a process for reducing the production of water in oil wells which comprises the injection of an aqueous solution of a cationic polymer into the formation.

The coproduction of water is a fact which concerns, to varying extents and with different times, all oil or gas wells, and which can have strong negative economic repercussions. The excessive production of water in fact causes both an increase in the costs relating to the disposal of the water and also to a reduction in income due to the limited productivity of hydrocarbons.

In gas fields, moreover, a high water-cut (i.e. the ratio between the water flow-rate of a well and the total water+hydrocarbon flow-rate) can lead to the flooding of the well and consequently its closure.

Furthermore, in the future, problems associated with the production of water will become even more important in view of the characteristics of fields currently in production and of new exploration frontiers. The production of existing fields in fact (increasingly more mature) is normally characterized by a water-cut which increases with time. The exploration frontiers moreover are moving towards offshore reservoirs, often in deep water, and in areas often characterized by severe environmental regulations In wells with a high water-cut, the problem can generally be solved by the mechanical insulation of the production area or by recompletion or workover. The latter solution however is extremely onerous and can cause the loss of enormous volumes of hydrocarbons present in the micro-levels still not influenced by the arrival of water.

"Water shut-off" interventions with gelifying chemical systems (usually polyacrylamides cross-linked with Cr(III) or with systems based on silicates), can represent a valid alternative to mechanical insulation; these compositions, injected into the formation, completely block the movement of the fluids in the zones treated. With this technique, it is possible to totally reduce or eliminate the production of water at accessible costs. This technology however only has a high probability of success when it is possible to identify and selectively insulate the water production areas during the treatment, so as not to damage production from the layers still saturated with hydrocarbons.

Finally, the RPM (Relative Permeability Modifier) technology is based on the injection, in all intervals open for production, of a chemical agent capable of selectively reducing the permeability to water. The chemical systems used in this type of treatment are hydrosoluble polymers which modify the permeability of the formation following adsorption on the rock surface. In this way, the permeability in the high water-cut intervals is selectively reduced, whereas the permeability of the intervals which produce hydrocarbons remains unaltered. Intervening with this approach, when appropriate, has numerous advantages with respect to the conventional technologies, in particular: (i) limit risk of damage, (ii) low environmental impact, (iii) low cost of the treatment thanks to interventions of the "bullheading" type.

The condition necessary for effective treatment with a permeability modifier polymer is that the polymer itself must interact with the rock surface creating a layer capable of modifying the flow properties of the porous medium. The polymer must therefore have a particularly strong attractive interaction with the rock surface, in order to maximize the adsorption and stability of the layer of adsorbed polymer, over a period of time.

The polymers used so far have various limitations which have delayed the diffusion of the RPM technology. In particular: polyacrylamides (PAM) have a poor efficacy and reduced duration of the treatment due to the limited thermal stability; polyactylamides modified by the introduction of cationic groups have a good efficacy but low resistance to temperature; biopolymers (such as scleroglucan) have infectivity problems as a result of the high viscosity of the polymeric solution and its tendency to flocculate.

Experts in the field have consequently felt the necessity of finding polymers capable of being more effectively adsorbed on rock matrices and therefore capable of selectively reducing the permeability to water and also resistant to the temperature of the formation.

It has now been found that particular cationic polymers adequately satisfy the above demands, and are particularly thermally stable at medium-high temperatures. Adsorption tests carried out on siliceous sand using polymers containing cationic groups and analogous non-ionic polymers have in fact demonstrated that the former are more strongly adsorbed on the rock with respect to the latter, as a result of the attractive interaction between the surface of the negatively charged sand and the positively charged polymer.

In accordance with this, the present invention relates to a process for reducing the production of water in oil wells which comprises the injection into the formation around the well of an aqueous solution of one or more polymers selected from those having general formula (I):

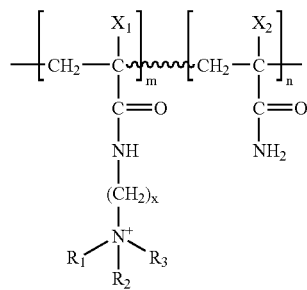

wherein n ranges from 0.70 to 0.98, preferably from 0.80 to 0.95;

m ranges from 0.30 to 0.02, preferably from 0.20 to 0.05;

n+m=1;

$X_1$ and $X_2$, the same or different, are selected from H and $CH_3$;

$R_1$, $R_2$, $R_3$, the same or different, are selected from $C_1$–$C_{10}$ monofunctional hydrocarbyl groups; preferably $C_1$–$C_3$ alkyl radicals;

x ranges from 2 to 5, preferably x=3.

In the preferred embodiment, in the compound having general formula (I) the polymers have: (1): n=0.95, m=0.05, x=3, $X_1$=H, $X_2$=$CH_3$, $R_1$=$CH_3$, $R_2$=$CH_3$, $R_3$=$CH_3$; or (2): n=0.90, m=0.1, x=3, $X_1$=H, $X_2$=$CH_3$, $R_1$=$CH_3$, $R_2$=$CH_3$, $R_3$=$CH_3$. The molecular weight of the polymers usually ranges from 1.5 to 12 million.

The aqueous solution which can be used in the process of the present invention contains a quantity of polymer of the compound having general formula (I) preferably ranging from 500 to 8000 ppm, even more preferably from 1500 to 5000 ppm.

Any type of water available provided it has no suspended solids, can be used as carrying medium, as the compound having general formula (I) is neither influenced by the type or quantity of anions and cations usually contained in water.

The aqueous solution of the present invention normally has a viscosity ranging from 1.5 to 10 cP, much lower values than those of the gelifying solutions.

The volume of aqueous solution to be injected into the formation depends on the height of the production formation to be treated and on the depth to which the solution must penetrate (invasion radius).

The flow-rate of the aqueous solution to be injected is selected in relation to the type of formation to be treated. Furthermore the aqueous solution to be injected can be fed into the formation at the desired pressure, provided this is not higher than the fracture pressure. It is known to experts in the field that it is advantageous for the solution to be injected as rapidly as possible, compatibly with the characteristics of the formation, in order to reduce the treatment time and consequently production-stoppage, to the minimum.

When considered necessary, the process of the present invention can be preceded by an optional pretreatment step (preflush) which can be carried out for example with an aqueous solution containing a surface-active agent, in order to clean the formation to be treated and obtain a more effective adsorption of the polymer.

In the preferred embodiment, the process of the present invention is preferably followed by an overflush step, i.e. treatment of the formation with brine or gas or oil, in order to push the polymer into the formation. The overflush with gas also has the purpose of re-establishing the connectivity of the gas layer (in gas wells).

Finally, at the end of the injection of the aqueous solution of the compound having general formula (I), a shut-in step is preferably effected, i.e. closure of the well to allow a more effective adsorption of the polymer on the rock matrix.

The process of the present invention has many advantageous aspects, and in particular requires limited quantities of polymer having general formula (I). Furthermore it has the unexpected advantage of being applicable to both gas and oil formations, with temperatures up to about 70° C.

The following examples are provided for a better understanding of the present invention.

EXAMPLES

The polymer (called FO, produced by Floerger) used in the examples has the following formula. It is a poly{acrylamide-methacrylamide (propyltrimethylammonium)} copolymer. The polymer has a molecular weight equal to 5 million.

For comparative purposes, in the experimental part another cationic polymer is also used, which is not a part of the invention. This is a cationic polymer (MCAT, produced by MI Drilling Fluids), a poly{acrylamide-acrylamide-(methyltrimethylammonium)} copolymer. The polymer has a molecular weight equal to 2 million.

Both products are in the form of a white powder. In particular, the product FO has a particle-size ranging from 10–100 mesh.

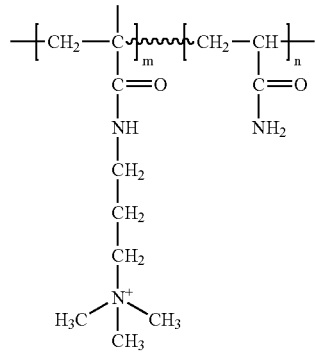

Chemical Structure of the Cationic Polymer FO (FO3150: n=0.95, m=0.05; FO3190: n=0.90, m=0.1)

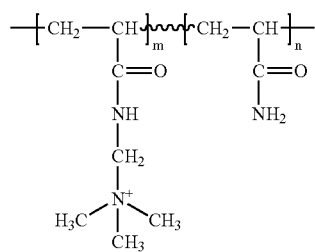

Chemical Structure of the Cationic Polymer MCAT (p=0.95, q=0.05)

Example 1

Performances of the Cationic Polymers FO and MCAT

The performances of the polymers FO and MCAT were evaluated by means of: a) Adsorption test on sand of the solutions; b) Thermal stability evaluation by means of NMR analysis; c) Core test 1a—Static Adsorption Test at a Temperature of 25° C.

The polymer solutions were prepared in brine (filtered and degassed solution of KCl 2%) at concentrations of 1000 or 2000 ppm. After putting a certain quantity of sand (3–5 g) in contact with the polymeric solution in a hermetically sealed glass container, the solution with the sand is put under stirring at the desired temperature to favour contact between the polymer and surface of the sand. After about 24 hours at 25° C., the quantity of polymer adsorbed at the interface is determined by difference (between that initially charged and that remaining in the solution after the test) by means of TOC analysis (Total Organic Carbon).

The tests were carried out using sand with a prevalently siliceous and clay composition. Table 1 shows a comparison between the adsorption values of the FO polymers and of the comparative MCAT polymer.

TABLE 1

Adsorption comparison, at 25° C., of solutions of
the FO polymer (3150) on sand (quartzite and reservoir)
and analogous solutions of the MCAT polymer. The reservoir
sand used has the following composition:
reservoir sand 1: quartz 50%, K-feldspar 6%, plagioclase
15%, calcite 6%, dolomite 1%, clays/micas 22%
reservoir sand 2: quartz 49%, plagioclase 17%, calcite
21%, clays/micas 4%

|  | Temp. (° C.) | Conc. solution (ppm) | Adsorption (mg/g sand) FO3150 | Adsorption (mg/g sand) MCAT |
|---|---|---|---|---|
| Quartzite | 25 | 1000 | 0.24 | 0.13 |
|  | 25 | 2000 | 0.3 | 0.32 |
| Reservoir 1 | 25 | 1000 | 0.75 | 0.7 |
|  | 25 | 2000 | 1.6 | 1.15 |
| Reservoir 2 | 25 | 1000 | — | 0.78 |
|  |  | 2000 |  | 1.09 |

It can be observed that all the polymers have a high adsorption (both on quartzite sand and on reservoir sand), a necessary but insufficient condition for the success of the RPM treatment.

For successful treatment, in fact, the thermal stability of the polymer must also be considered, in particular of the active cationic group, at the desired temperature.

1b1—Evaluation of the Thermal Stability by Means of NMR Analysis

The thermal stability of the product was evaluated by means of NMR analysis carried out on aqueous solutions of the polymers FO 3150 and MCAT, and in particular the concentration of active cationic groups present at the different temperatures was determined.

Table 2 provides a comparison between the thermal stability of the polymer MCAT (in terms of percentage of cationic groups hydrolyzed at the test temperature) and the polymer FO of the present invention.

TABLE 2

Comparison between the thermal stability of the solution of the
polymer MCAT and of the solution of the polymer FO 3150
of the present invention after 21 days (via NMR analysis)

| Temperature | MCAT % of cationic groups hydrolyzed | FO % of cationic groups hydrolyzed |
|---|---|---|
| 48° C. | 58 | not determinable |
| 70° C. | >99 | 5 |

A significant degradation of the active cationic groups of the polymer MCAT can be observed at 70° C. The presence of a single —$(CH_2)$— group attached to the acrylamide group probably makes the bond particularly labile at high temperatures.

The polymer FO of the present invention, on the contrary, is thermally stable.

1b2—Static Adsorption Test at Temperatures of 70° C.

Following the procedure described in 1a, adsorption tests were effected on sand at a temperature of 70° C., using the polymer MCAT and the polymer FO of the present invention.

The results of the test are indicated in Table 3.

TABLE 3

Comparison of the adsorption of solutions of the polymer FO 3150
on sand (quartzite and reservoir) and analogous solutions of the
polymer MCAT. The reservoir sand used has the mineralogical
composition indicated in the description of Table 1.

|  | Temp. (° C.) | Conc. solution (ppm) | Adsorption (mg/g sand) FO3150 | Adsorption (mg/g sand) MCAT |
|---|---|---|---|---|
| Quartzite | 70 | 1000 | 0.25 | 0.035 |
|  | 70 | 2000 | 0.22 | 0.15 |
| Reservoir 1 | 70 | 1000 | 0.7 | 0.4 |
|  | 70 | 2000 | 1.5 | 0.8 |

It can be observed that the polymer FO has high adsorptions both on clean sand (quartzite) and reservoir sand. Furthermore the adsorptions are comparable both at room temperature and at 70° C. (see Table 1 as a comparison), indicating the fact that the polymer has not undergone substantial structural modifications, i.e. that the active cationic groups are stable at 70° C. The polymer MCAT, on the contrary, shows a reduced adsorption with respect to the value observed at room temperature, in accordance with the degradation of the active cationic groups.

1-c—Test in a Porous Medium

After verifying the adsorption of the polymer on rock, the efficacy of the polymer MCAT was evaluated in selectively reducing permeability to water by means of a test in a porous medium. Two tests were effected in a porous medium at two different temperatures: 48 and 70° C.

The sandpack was prepared using about 40 grams of sand, so as to obtain a core length equal to about 5 cm to which 2 cm of gravel having 20–40 mesh, are added, one at the head and one at the tail, held by two 70-mesh metallic nets. The diameter of the sandpack is equal to 1".

Once the sandpack has been assembled in the Hassler steel cell, a boundary pressure of 20 bars is established to avoid the bypassing of the fluids between the VITON tube (which contains the core) and the porous medium. The following procedure is adopted:

Saturation under vacuum of the sandpack with brine (2% KCl) and subsequent determination of the porosity and absolute permeability at room temperature and at the temperature of interest.

Flush of the brine with gas (nitrogen previously humidified) or oil (crude field oil): determination of the initial permeability relating to the gas ($K_{in}$ gas) or crude field gas ($K_{in}$ crude field oil) and the corresponding saturation in water.

Flush of the gas (or crude field oil) with brine: determination of the initial permeability relating to the brine ($K_{in}$ brine) and the corresponding saturation in gas (or crude field oil).

Injection of the polymeric solution of MCAT (1500 ppm) previously filtered and degassed (from 10 to 12 pore volumes) at a constant flow-rate. During the flush the pressure values are collected together with the outgoing fractions to determine the quantity of polymer adsorbed.

Shut-in of 24 hours.

Flush of the polymer with brine (2% KCl) at a constant flow-rate (about 1 PV/h). During the flushing the pressure vales are recorded and the outgoing fractions collected.

Determination of the permeability to brine after the treatment with the polymer ($K_{fin}$ brine).

Determination of the permeability to gas or oil (crude field oil) after the treatment with the polymer ($K_{fin}$ gas, $K_{fin}$ crude field oil) and of the saturation in brine.

The results of the tests are summarized in Table 4.

TABLE 4

Results of the test in a porous medium with the polymer MCAT (1500 ppm). The reduction in permeability to water was calculated after injecting from 600 to 900 pore volumes (PV) of brine. The reservoir sand used has the composition indicated in the description of Table 1.

| Sand | Temp. (° C.) | K initial brine (mD) | Reduction brine permeability (%) | Reduction gas permeability (%) |
|---|---|---|---|---|
| Reservoir 2 | 48 | 78 | 77 | 20 |
| Reservoir 2 | 70 | 122 | 22 | — |

It can be observed that the polymer MCAT is effective as permeability modifier relating to a temperature of about 50° C. At 70° C. the reduction in permeability to brine is significantly reduced with respect to what is observed at lower temperatures (22% against 77%). This is in accordance with the data of the static adsorption tests and with the NMR analyses carried out on the solutions, which showed a considerable degradation of the polymer MCAT at 70° C. with an almost complete detachment of the active cationic groups. The cationic group is essential for obtaining a good adsorption and consequently a good reduction in the permeability to brine.

Example 2

Performances of the Polymer FO of the Present Invention

Once the thermal stability of the polymer FO, whose solutions proved to be stable at temperatures equal to 70° C., has been defined, the performances of the product were evaluated by means of adsorption tests on sand and tests in a porous medium,-in which the reduction in permeability to brine and the effect on permeability to hydrocarbons (gas, oil), were evaluated.

2-a—Static Adsorption Test

The adsorption tests on sand were carried out using two different formulations of the polymer, in particular:

FO3150 (5% moles MAPTAC, 95% moles AM; n=0.95, m=0.05)

FO3190 (10% moles MAPTAC, 90% moles AM; n=0.90, m=0.1)

wherein MAPTAC: methacrylamide propyl trimethylammonium, AM: acrylamide.

Table 5 shows a comparison of adsorption data of the two FO polymers which differ in the content of the cationic component: 5% in moles in FO3150, 10% in moles in FO3190.

TABLE 5

Comparison of the adsorption of solutions of the polymer FO3150 (5% cationicity) and FO3190 (10% cationicity) on sand (quartzite and reservoir sand). The reservoir sand used has the composition indicated in the description of Table 1.

| | FO 3150 | | | FO 3190 | | |
|---|---|---|---|---|---|---|
| Sand | Temp. (° C.) | Conc. solution (ppm) | Adsorption (mg/g sand) | Temp. (° C.) | Conc. solution (ppm) | Adsorption (mg/g sand) |
| Reservoir 1 | 25 | 1000 | 0.75 | 25 | 1000 | 0.89 |
| | 25 | 2000 | 1.6 | 25 | 2000 | 1.77 |
| | 70 | 1000 | 0.7 | 70 | 1000 | 0.65 |
| | 70 | 2000 | 1.5 | 70 | 2000 | 1.6 |

It can be observed that, within this composition range, the degree of cationicity does not seem to influence the adsorption level: the quantity of polymer adsorbed is about the same for both the polymer FO3150 and the polymer FO3190.

2-b—Tests in a Porous Medium

In the tests in a porous medium, carried out with the purpose of evaluating the efficacy of the FO polymer in reducing permeability to brine, the procedure described in Example 1-c was adopted. Also in this case, a polymeric solution (in brine KCl 2%) of 1500 ppm, was used.

The following tests were carried out:

test in a porous medium on sandpack (quartzite) at room temperature: determination of the reduction in the absolute permeability to brine test in a porous medium on sandpack (reservoir sand 1) at 70° C.: determination of the reduction in permeability relating to brine and evaluation of the effect on the permeability relating to gas. The reservoir sand used has the mineralogical composition indicated in the description of Table 1.

test in a porous medium on core (clashach) at 70° C.: determination of the reduction in permeability relating to brine and evaluation of the effect on the permeability relating to oil. The core (length 10 cm, diameter 2.54 cm, pore volume 9.28 cm$^3$) has the following mineralogical composition: quartz 95%, K-feldspar 5%.

In the tests in the porous medium carried out with the brine-oil biphasic system, a crude field oil was used.

The results of the test are indicated in Table 6.

TABLE 6

Tests in a porous medium effected with the FO polymer. Gas was used for the test carried out with reservoir sand; a typical crude field oil was used for the test with Clashach.

| Core | Initial permeabil. (mD) | Temperature (° C.) | Reduction permeabil. brine (%) | Reduction permeabil. gas (%) | Reduction permeabil. oil (%) |
|---|---|---|---|---|---|
| Quartzite | 1182 | Room temp. | 59.4 | — | — |
| Reservoir 1 | 26 | 70 | 94 | 31 | — |
| Clashach | 47 | 70 | 62 | — | 18 |

The invention claimed is:

1. A process for reducing the production of water in oil wells which comprises the injection into the formation around the well of an aqueous solution of one or more polymers selected from those having general formula (I)

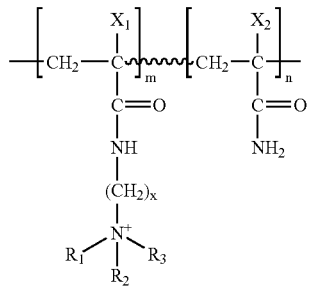

wherein:
- n ranges from 0.70 to 0.98;
- m ranges from 0.30 to 0.02;
- n+m=1;
- $X_1$ and $X_2$, the same or different, are selected from H and $CH_3$;
- $R_1$, $R_2$, $R_3$, the same or different, are selected from $C_1$–$C_{10}$ monofunctional hydrocarbyl groups;
- x ranges from 2 to 5.

2. The process according to claim 1, characterized in that n ranges from 0.80 to 0.95 and m ranges from 0.20 to 0.05.

3. The process according to claim 1, characterized in that $R_1$, $R_2$, $R_3$, the same or different, are selected from $C_1$–$C_3$ monofunctional alkyl radicals.

4. The process according to claim 3, characterized in that $R_1=R_2=R_3=CH_3$.

5. The process according to claim 1, characterized in that x=3.

6. The process according to claim 1, characterized in that the polymer having general formula (I) has a molecular weight ranging from 1.5 to 12 million.

7. The process according to claim 1, characterized in that the concentration of the polymer having general formula (I) in the aqueous solution ranges from 500 to 8000 ppm.

8. The process according to claim 7, characterized in that the concentration of the polymer having general formula (I) in the aqueous solution ranges from 1500 to 5000 ppm.

9. The process according to claim 1, characterized in that in the polymer having general formula (I) n=0.95, m=0.05, x=3, $X_1$=H, $X_2$=$CH_3$, $R_1$=$CH_3$, $R_2$=$CH_3$, $R_3$=$CH_3$.

10. The process according to claim 1, characterized in that in the polymer having general formula (I) n=0.90, m=0.1, x=3, $X_1$=H, $X_2$=$CH_3$, $R_1$=$CH_3$, $R_2$=$CH_3$, $R_3$=$CH_3$.

11. The process according to claim 1, characterized in that it is preceded by an optional pretreatment step (preflush).

12. The process according to claim 11, characterized in that the pretreatment step is effected with an aqueous solution containing a surface-active agent.

13. The process according to claim 1, characterized in that at the end of the above process, an optional over-flush step is effected, or a treatment of the formation itself with brine or gas or oil.

* * * * *